Figure 1:
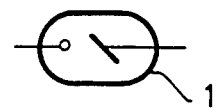
Figure 1:
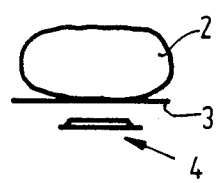

United States Patent [19]

Conrads et al.

[11] Patent Number: 4,752,944
[45] Date of Patent: Jun. 21, 1988

[54] METHOD AND APPARATUS FOR PRODUCING AN X-RAY IMAGE BY MEANS OF A PHOTOCONDUCTOR

[75] Inventors: Norbert Conrads, Hauset, Belgium; Walter Hillen, Aachen, Fed. Rep. of Germany; Peter J. Quadflieg, Aachen, Fed. Rep. of Germany; Ulrich Schiebel, Aachen, Fed. Rep. of Germany

[73] Assignee: U.S. Philips Corporation, New York, N.Y.

[21] Appl. No.: 897,578

[22] Filed: Aug. 8, 1986

[30] Foreign Application Priority Data

Aug. 14, 1985 [DE] Fed. Rep. of Germany ....... 3529108

[51] Int. Cl.$^4$ .................... H04N 1/10; B41M 5/00
[52] U.S. Cl. ........................................ 378/28; 378/32
[58] Field of Search ...................... 378/28, 29, 31, 32; 358/213.15, 213.16, 221; 250/252.1

[56] References Cited

U.S. PATENT DOCUMENTS 3,879,610  4/1975  Baker ................................. 378/28
4,602,291  7/1986  Temes ........................... 358/213.16

FOREIGN PATENT DOCUMENTS 0056599  7/1982  European Pat. Off. .

Primary Examiner—Carolyn E. Fields
Assistant Examiner—Joseph A. Hynds
Attorney, Agent, or Firm—Jack E. Haken

[57] ABSTRACT

A method and apparatus for producing an X-ray exposure by means of a photoconductor. Photoconductor defect locations which appear as artefacts in the X-ray image are eliminated by subtracting a compensated dark discharge image from the X-ray image.

4 Claims, 2 Drawing Sheets

METHOD AND APPARATUS FOR PRODUCING AN X-RAY IMAGE BY MEANS OF A PHOTOCONDUCTOR

The invention relates to a method and apparatus for producing an X-ray exposure by means of an X-ray converting photoconductor, which locally and uniformly charged prior to an X-ray exposure, is discharged during the X-ray exposure dependent on the intensity of X-radiation, and the surface of which is then scanned to determine the charge density. An image valve is thus formed at each image point corresponding to the discharge at the respective image point.

Such a method and apparatus are known from the Journal SPIE Vol. 454 Application of Optical Instrumentation in Medicine XII (1984), pages 265 to 270 and also from U.S. Pat. No. 4,134,137. The two-dimensional charge pattern produced on the surface of the photoconductor, which essentially corresponds to the spatial distribution of the X-radiation intensity, is scanned by a electrometer arrangement and converted into an electric signal. The electric signal is amplified, filtered, digitized and stored in a memory. It is then accessible for digital image processing.

The photoconductor is normally a non-conductor. When it is exposed to X-radiation its conductivity increases during radiation at the exposed locations, so that the charge density produced by a prior charging is reduced at these locations. The greater the intensity of the X-radiation and the longer it is incident on the photoconductor, i.e. the higher the dose at the respective location, the greater this charge reduction becomes. An essential problem with such an imaging system is posed by defect locations in photoconductive layer, which lead to the punctiform artefacts in the image. At these defect locations local charge deficits arise—caused for example by small conductive areas in the photoconductive material.

The object of the present invention is to provide a method and apparatus for the execution of the method whereby the influence of the defect locations on the X-ray image is reduced.

This object is achieved in that for the correction of the image values prior to the X-ray exposure or after the scanning of the image values the photoconductor is charged and scanned without radiation and that each image value of the dark discharge image thus produced or a value derived from it is subtracted from the image value of the X-ray image or a value derived from it for the same image point.

An apparatus for the execution of this method is based on an X-ray source, a photoconductor applied as a homogeneous layer on a conductive substrate, an electrometer arrangement for detecting the charge density at individual (image) points of the photoconductive layer, a first storage arrangement for storing the image values of the X-ray image and with a reproduction unit for reproducing the spatial distribution of the intensity of the X-radiation. It is characterized in that there is provided a second storage arrangement for recording the image values of a dark discharge image. Means are provided for constituting the difference between image values stored in the two storage arrangements for the same image point or values derived from these. The difference can be fed to the reproduction unit.

The invention is based on the knowledge that the defect locations produce disturbing effects both in the X-ray image and the dark discharge image at the same location. If therefore the dark discharge image is subtracted image point for image point from the X-ray image, then a corrected X-ray image is produced in which the artefacts are less pronounced at the defect locations.

The dark discharge behaviour of the photoconductor can be changed by exposure to X-radiation. It must therefore be continuously re-recorded at certain intervals—preferably after each exposure, although in the case of serial exposures in rapid successions this may possibly be dispensed with. Since the change in the dark discharge behaviour becomes more pronounced, the greater the dose administered to the photoconductor, it is also possible to make the decision to record a dark discharge image dependent on the level of discharge in the individual X-ray exposures.

According to the invention, selenium is preferably used as the photoconductor; the invention may, however, also be used with other photoconductors, e.g. lead oxide.

A further study of the defect locations has shown that the deviation of the charge density at the defect location from that of a location without defect is dependent on the intensity of the X-radiation: the larger the dose administered in the X-ray exposure, i.e. the greater the discharge and the smaller the charge density, the smaller the deviation becomes. If, therefore, the image values of the dark discharge image are directly subtracted from the image values of the X-ray image, there results an "over-compensation". While the defect locations in a non-corrected X-ray image appear as if they have been subjected to an excessive radiation intensity, the defect locations in the X-ray image produced by direct subtraction appear as if they had been exposed to a reduced intensity of radiation compared to the surrounding area—although the deviation from the normal value is reduced in the latter case.

In order to also remove these residual faults, a further embodiment of the invention provides that the image values of the dark discharge image are multiplied by a correction factor dependent on the charge density of the assigned image point in the X-ray exposure, said correction factor decreasing in direct proportion to the charge density in the X-ray exposure.

Preferably, a number of X-ray exposures is produced to determine the correction factor as a function of the charge density. The whole photoconductive layer is exposed in each case to a specific dose. For the charge density measured in each case at the locations without defect the value stored as the correction value is that which results from the ratio of the difference between this charge density and the charge density at a defect location to the corresponding difference in the dark discharge image. The image values of the dark discharge image are multiplied by the correction factors thus determined, before they are subtracted from the image values of the X-ray image.

It has been shown that the number of defect locations and the amplitude of the artefacts caused by them increases out of proportion to the electric field strength in the photoconductive layer. On the other hand the signal-to-noise ratio also increases with the field strength. A preferred further embodiment of the invention thus provides that the charging voltage and the thickness of the selenium layer are selected such that the field strength in the selenium layer lies between 2 volt/$\mu$m and 4 volt/$\mu$m.

Figure 2:
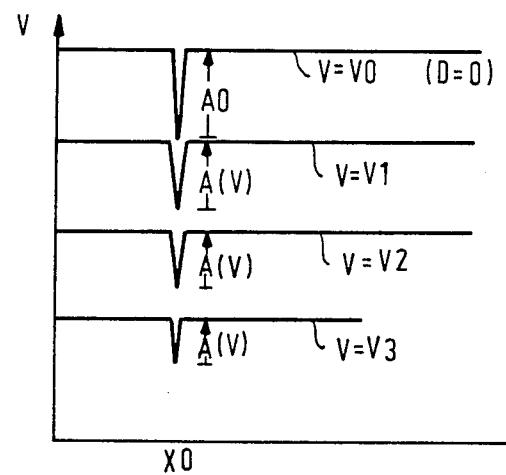
Figure 3:
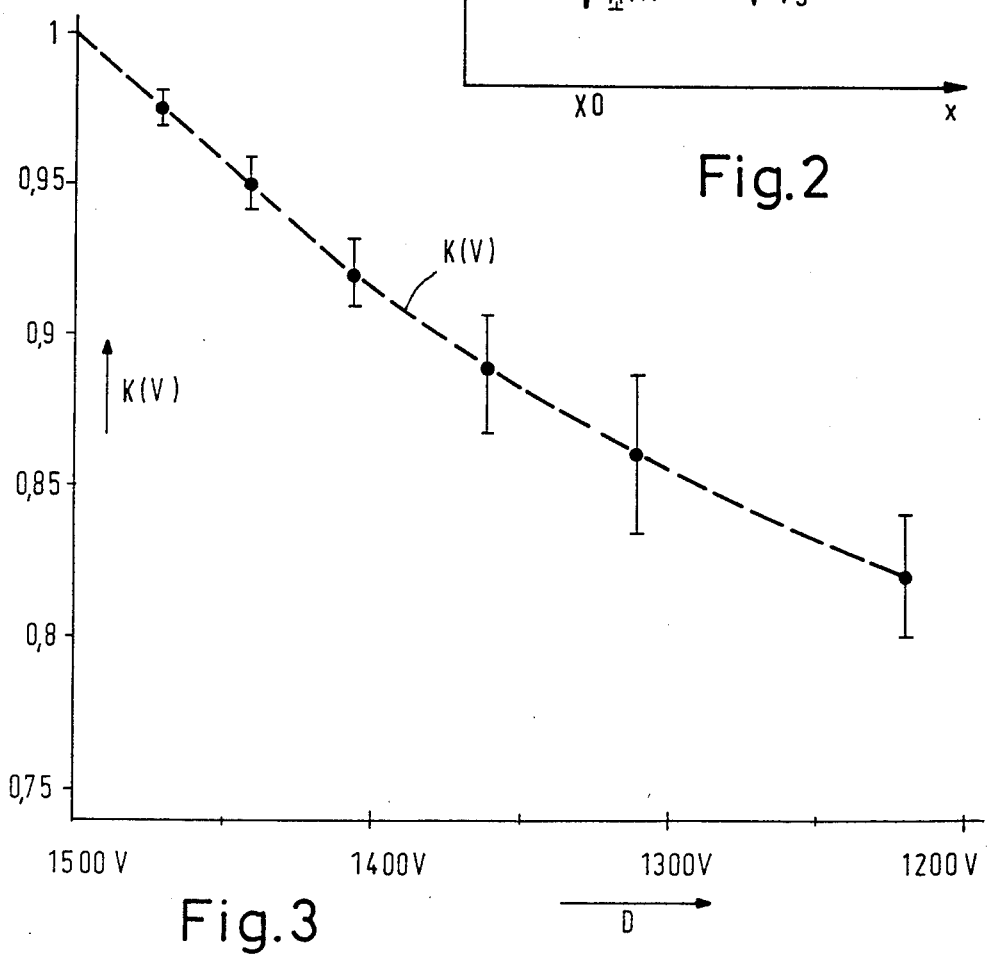
Figure 4:
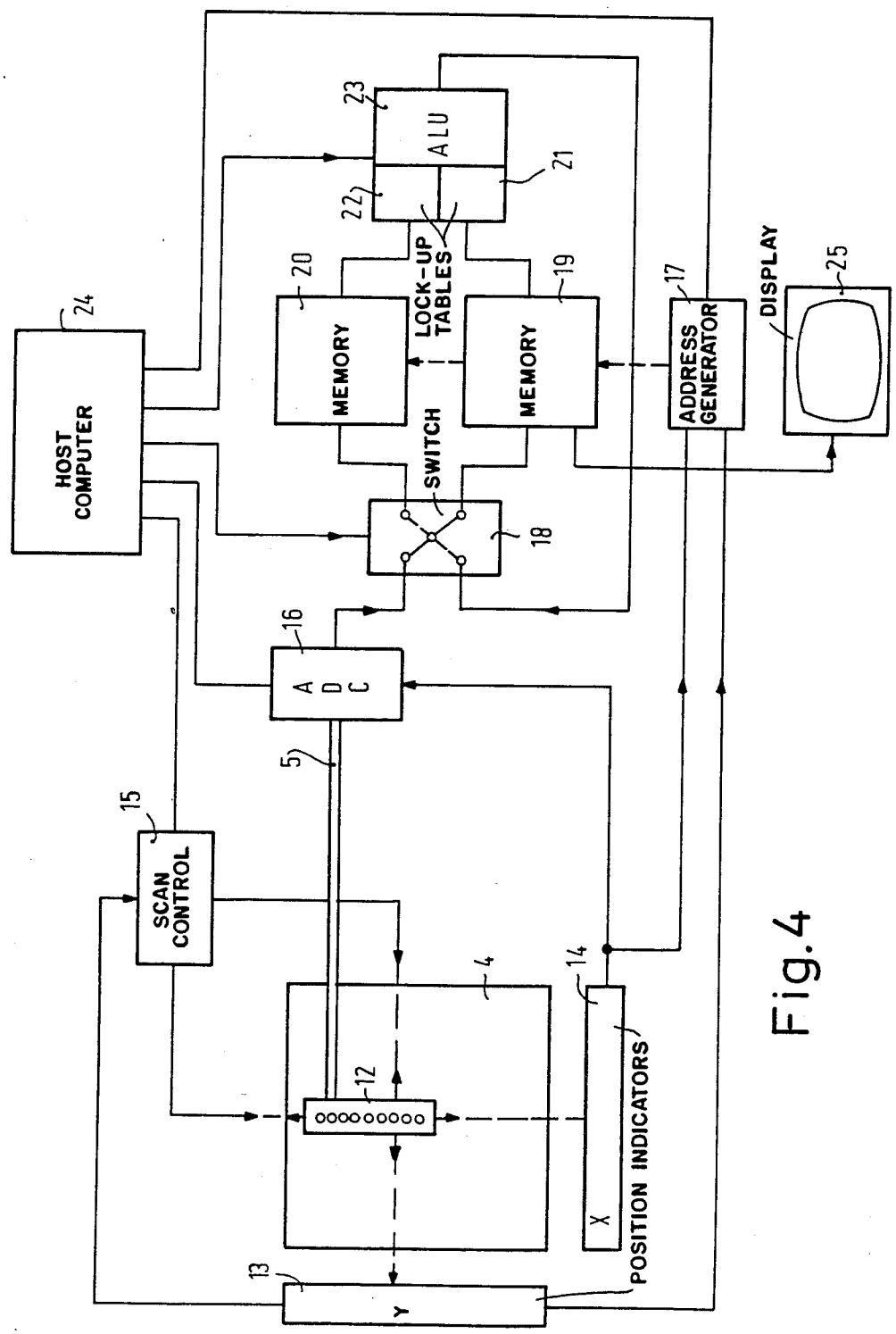

The invention will be described in further detail with reference to the diagram. The following are shown:

FIG. 1 an X-ray examination arrangement in which the method according to the invention can be applied, FIG. 2 the charge density profile along a straight line on which one defect location is located, subject to radiation with varying dosage, FIG. 3 the course of the correction factor as a function of the dose, FIG. 4 an arrangement for the execution of the method according to the invention.

In FIG. 1 an X-ray tube assembly is shown with 1 which irradiates an examination subject 2, for example a patient, lying on a table-top 3. Underneath the table-top there is a record carrier 4 consisting of an aluminium substrate onto which a homogeneous layer of selenium 500 μm thick is sedimented. This layer is charged before each exposure locally and uniformly to 1,500 volts (against the substrate) by a charging device not shown in greater detail. In an X-ray exposure the X-ray shadowgraph of the subject 2 is projected onto the record carrier 4. The conductivity which prior to the beginning of the exposure is minimal—ideally zero—, is thus increased in the selenium layer, dependent on the intensity of the X-radiation attenuated by the body 2 at the relevant image point (here and in the following image point is not a point in the mathematical sense, but a finite, preferably quadratic area of the surface of the selenium layer with a size of e.g. 200 μm×200 μm). As a result the surface of the selenium layer is not constantly discharged so that the discharge depth is a measure of the dose. In other words, the X-ray shadowgraph of the subject 2 is converted into a charge image on the surface of the selenium layer. This charge image is scanned by an eletrometer arrangement and the electronic signals produced thereby are amplified and digitized so that a digital image processing is possible.

In practice the selenium layer has defect locations, i.e. small, mainly punctiform areas, which even without X-radiation have conductivity. The surface at these locations is discharged independent of the X-radiation. It is obvious that the charge density converted at this location into an image value partly with the aid of the electrometer arrangement produces a disturbance, an artefact, in the X-ray image composed of image values.

The manufacture of the selenium layer such that these defects do not occur or only in a number which does not disturb the image pattern is extremely difficult and laborious. It has been shown, however, that the number and the amplitude of the artefacts increases out of proportion with a greater charging level of the selenium plates. It is therefore advisable to set the voltage to which the surface is charged before radiation and the thickness of the selenium layer in such a way that the electric field strength in the selenium layer is markedly smaller than 10 V/μm—a value which is even slightly exceeded in the arrangement according to US-PS No. 4,134,137. On the other hand, however, this field strength should not be made too low, since the signal-to-noise ratio at the locations without defect will become too low. The electric field strength should therefore lie between 2 V/μm and 4 V/μm.

Even with these values there are generally still a number of defect locations (imperfections) with dark discharge speeds lying in most cases around 20 V/min., but which as a rule do not exceed a value of 100 V/min. At the locations without defect on the other hand the dark discharge speed is only 2–5 V/min. under the same conditions. Even if the time between the end of charging and the beginning of scanning is made relatively short—a suitable value is maximum 30 sec.—and if the scanning by the electrometer arrangement can be done in a very short time, the artefacts produced at the defect locations in the X-ray image cannot be prevented from adversely affecting its evaluation.

The invention exploits the fact that the charging at the surface of the selenium layer decreases at the defect locations even if these are not exposed to any X-radiation. If therefore a dark discharge image is produced, i.e. an image in which the photoconductor is not hit by X-radiation in the period between the end of charging and the scanning, then this image will have artefacts at the same places as the X-ray image produced by the X-ray exposure. If, therefore, the dark discharge image, or the image values from which this image is composed, are subtracted point for point from the image values of the X-ray image produced by an X-ray exposure, then there will already be a reduction in the artefacts, although with two limitations:

It is not sufficient simply to produce a dark discharge image once for a record carrier and to subtract this from all X-ray images. The dark discharge behaviour of the selenium layer is changed in fact by X-radiation, and to a greater extent, the higher the dose received during an exposure. It is therefore not sufficient to record a dark discharge image only once a day or even less frequently. It is recommended that such a dark discharge image should if possible be re-recorded after every exposure and used for the X-ray image produced from the next X-ray exposure. At a higher picture frequency this may possibly be dispensed with. It is also possible to make the decision whether a new dark discharge image should be recorded dependent on the preceding exposure level and thus on the anticipated change in the dark discharge behaviour. It is also important for the time between the charging of the record support and the scanning of the discharge image be kept constant.

A precise correction of the X-ray image is not possible by subtraction of the dark discharge image. The reasons for this can be explained with reference to FIG. 2, which shows the course of the charge density and the surface potential as a function of the location under different radiation doses. The top curve shows the potential V at the surface of the selenium layer at the dose zero, i.e. in a dark discharge image in which there is no exposure to X-radiation between charging and scanning. The potential thus essentially has the value $V=V_o$ at the surface, whereby $V_o$ is the voltage to which the surface is charged. Only at the location $x=x_o$, which is a defect location, is the potential lower by the value $A_o$. FIG. 2 shows the surface potential along the same straight line after a locally uniform exposure of the record carrier to various doses. It is recognized that with a decreasing surface potential at the locations without defect, i.e. with increasing dose, the deviation $A(V)$ at the defect location becomes steadily smaller compared with the surroundings.

Therefore, if the dark discharge image is subtracted from the X-ray image, the artefact is overcompensated at the defect location $x=x_o$: while the non-corrected X-ray image gives the impression that the record carrier had received a larger dose at the location $x=x_o$, the corrected X-ray image produced by subtraction of the dark discharge image from the X-ray image gives the impression that it was exposed to less X-radiation at the defect location. To eliminate this residual error it is necessary to correct the X-ray image according to the equation.

$$B(x, y) = V(D; x, y) - V_o - (V(O; x, y) - V_o) * K(V; x, y) \quad (1)$$

where B(x, y) is the image value of the X-ray image with spatial coordinates x, y and where the xy plane runs parallel to the surface of the selenium layer. V(D, x, y) is the surface potential of this image point in an X-ray exposure, while the difference between this surface potential and the value Vo (1500 volts in the example given) corresponds to the image value of the non-corrected X-ray image. V(O; x, y) denotes the surface potential of this image point in the dark discharge image, while the difference from Vo corresponds to the image value for this image point in the dark discharge image. K(V; x, y) denotes a correction factor which is assigned to this image point and which is calculated for the defect location examined in FIG. 2 from the equation $$A(V)/A_o$$

and is dependent on the respective surface potential (V1, V2 and V3).

The execution of the correction procedure according to this formula requires however, that first of all the spatial coordinates x, y are determined, in that, for example, the dark discharge image is scanned and the coordinates of all image points at which the surface potential falls below a predetermined value are stored, and that for each of the defect locations determined in this way the dependence of the correction factor K on the surface potential is determined in that a series of X-ray images exposed uniformly to varying doses is produced and the deviation A from the surface potential is measured in the defect-free surroundings. It is clear that such a correction requires considerable calculation time and storage space, with the additional problem that the table in which the spatial coordinates of the defect locations and the dosage dependence on the correction factor are stored must be renewed from time to time due to the change in the dark discharge behaviour dependent on the X-radiation.

It has however been shown that the correction factors which have been calculated as indicated in connection with equation (1) and FIG. 2, have a relatively small range of variation, and it is thus possible to correct using correction factors K(V) which are only dependent on the dose or the surface potential, but not on the spatial coordinates of the respective defect location. Reference is made in this respect to FIG. 3.

FIG. 3 shows the correction factor K(V) as a function of the surface potential and—because surface potential and dose are linked with each other almost linearly—as a function of the dose, i.e. the amplitude A of an artefact standardized to its value Ao in the dark discharge image. The ranges of variation thus produced for various surface potentials and doses are indicated by the vertical error bars, whereby the arithmetic mean of the correction factors for the various defect locations at the respective surface potential is indicated by a point. Due to the small range of variation of these correction factors it is possible to cover all defect locations with one correction factor which is independent of the defect locations or its position x, y in the image and only dependent on the dose D and the surface potential V respectively. The course of the correction factor K(V) as a function of the surface density is shown in FIG. 3 by means of a broken line which joins the mean values determined at various doses and surface potentials. As these are mean values it is not necessary to record this curve again in the event of a change in the dark discharge behaviour after an X-ray exposure. It is therefore sufficient to only determine this once and keep this in a memory assigned to the record carrier.

In FIG. 4 an arrangement is provided for executing the correction procedure modified in this way according to equation (1). The surface of the selenium layer of the record carrier 4 is scanned by means of an electrometer arrangement 12 which contains a number of electrometer probes, each one of which detects the charge density or surface potential at one image point. Suitable electrometer arrangements are described, for example, in German patent Nos. 29 48 660 and 35 05 615. In order to permit the surface potential of all image points on the record carrier to be detected, the electrometer arrangement must be moved in two directions at right angles to each other relative to the record carrier 4. A programmable scan control 15 serves this purpose, which in turn is controlled by a suitable process controller or a host computer 24. The respective position of the electrometer arrangement is fed back to the scan control.

The electrometer arrangement 12 may contain for each electrometer probe a downstream amplifier and a scanner circuit and holding circuit, the output signals from which are fed via an analog multiplexer not shown in greater detail and in line 5 to the input of a analog to digital converter 16. The latter converts the values of the surface potential at the individual image points in the form of analog signals into digital data words with a word width of 16 bit μm. The strobe signals for the analog-digital converter 16 can be produced by the x-position indicator 14 (if the electrometer arrangement is moved first in the x direction and subsequently in the y direction). The digital data words produced in this way are fed via a switch 18 to a matrix memory 19 of which the storage capacity is sufficient to store the values assigned to all the image points of an X-ray or dark discharge image. The address under which the respective data word is stored is determined by an address generator 17 which is controlled by the x-and y position indicators 13 and 14.

A second matrix memory 20 is provided with the same storage capacity as the matrix memory 19. The two matrix memories 19 and 20 are connected with an arithmetic logic unit 23 each via a lookup table, which can be set via the host computer 24. The output from the unit may be connected to the data input of either matrix memory 19 or 20 via the switch 18.

The arrangement operates—controlled by the host computer 24—as follows:

First of all a dark discharge image is produced, i.e. a certain time after a charging of the surface of the record carrier 4 the surface potential is measured with the aid of the electrometer arrangement 12, without the record carrier being exposed to X-radiation. The data words corresponding to the surface potential V(O; x, y) which are produced in this dark discharge image for the individual image points are filed in the memory 20. An X-ray exposure is subsequently produced, whereby the period between the end of charging and the beginning of scanning is of the same length and the scanning of the surface is carried out in time and location according to the same pattern as for the dark discharge image. The data words for the X-ray image produced in this way are stored in the matrix memory 19. A function $f(V)=V$ is then loaded into the lookup table 22 and a function $f(V)=-Vo=$const) into the lookup table 21. These lookup tables interpret in known manner the data words V read out of the memory as addresses, under which the relevant function values f(V) are stored in the lookup table. The table values provided in this manner from the lookup tables 21 and 22 are added up in the arithmetic logic unit 23 and fed back into the memory 20 (under the address previously read out). When this has been repeated for all image points, the matrix memory 20 contains the image values (V(O; x, y)−Vo) of the dark discharge image. In the next processing step a function $f(V)=ln(K(V))$ is entered into the lookup table 21 and a function $f(V)=ln(V)$ into the lookup table 12. The values then fed from the lookup tables 21 and 22 to the arithmetic logic unit 23 are added up in this unit and are filed in the memory 10 under the address of the value just called up. Through this arithmetic operation the logarithm of the product of the correction factor K(V) derived from the X-ray image in the memory 19 and of the image value of the dark discharge image is formed for the same image point. This is repeated for all image points.

In the third processing step the function $f(V)=0$ is loaded into the lookup Table 21 (i.e. the lookup table supplies the value zero independently of the data word at its input), while the function $f(V)=\exp(V)$ is loaded into the lookup table 22. The values supplied thereby from the lookup tables are in turn added up in the arithmetic logic unit 23 and loaded into the memory 20 under the same address which was called up beforehand. The result of this arithmetic operation is that the logarithmation of the product in the preceding processing step is reversed again so that the product mentioned for the relevant image point is stored in the memory 20. This is repeated for all image points.

In the fourth processing step the function $f(V)=V$ is loaded into the memory 21 and the function $f(V)=-Vo$ into the memory 12 (the lookup table 22 thus supplies a data word corresponding to the value −vO at its output, independently of the data word at its input). The arithmetic logic unit in turn adds up the values supplied from the lookup tables, which this time are stored in the memory 19 under the address called up beforehand. This arithmetic operation effects the calculation of the image values (V(D; x, y)−Vo) of the X-ray image. At the end of this processing step therefore the memory 19 contains the image values of the X-ray image. In the final processing step the function $f(V)=vv$ is loaded into the memory 11 and the function f(V)−V into the lookup table 22. The values supplied by the lookup tables are in turn added up in the arithmetic logic unit and the result is loaded into the memory 19. This processing step supplies the image values B(x, y) of the corrected X-ray image according to equation (1).

The memory 19, in which the image values of the corrected X-ray image are stored on completion of this processing step, may serve as the backing storage of an image reproduction unit 25, e.g. an image monitor. The corrected X-ray image then appears without further loss of time on this image monitor. For filling purposes the memory also may be read out via the host computer 24 if required. As follows from the preceding description, each image point—therefore not only the image points at which there is a defect location—is subjected to the correction defined by the equation (1). Since in the dark discharge image the image value for an image point at a location without defect is ideally zero, the correction for the corrected X-ray is not altered as a result and the correction is only effective in the case of image points or image values assigned to a defect location.

In practice, however, at the locations without defect the image values in the dark discharge picture are not zero; even there the surface potential changes as a result of a dark discharge, although by an order of magnitude more slowly than at the defect locations. This change depends on when the respective image point is scanned. If the scanning time for the complete record carrier is for example 30 seconds, the image points scanned last may as a result of dark discharge lie more than 1 volt lower than the image points scanned first. This leads to a visible impairment of the image quality. These effects are eliminated by the method according to the invention.

If, for example, the surface potential in an image point is reduced by 0.9 volt in an X-ray exposure before it is scanned, then it will be reduced in the dark discharge image slightly more—for example by 0.95 volt—because the surface potential at the beginning of discharge is higher here than in the exposed image. According to equation (1) this slightly larger value is however multiplied by a factor slightly smaller than 1, so that the difference in the corrected image point practically disappears.

What is claimed is:

1. In a method for producing an X-ray image with an X-ray converting photoconductor which comprises the steps of:
   first uniformly electrically charging the photoconductor;
   then exposing the photoconductor to X-rays to locally discharge the photoconductor as a function of the local intensity of X-radiation;
   then scanning the surface of the photoconductor to measure the local charge density distribution on said surface and using said distribution to produce an X-ray image, the improvement comprising:
   separately producing a correction image by first uniformly electrically charging said photoconductor and then scanning the surface to measure the local charge density distribution in the absence of exposure to X-rays;
   multiplying the local values of the charge density in the correction image by a correction factor K(V) which decreases in direct proportion to the charge density at defect-free points in the X-ray exposure image, the value of said correction factor being determined by exposing said photoconductor to varying X-ray doses to produce different charge densities.

2. A method according to claim 1 wherein the time interval between the steps of charging the photoconductor and scanning the photoconductor to produce the correction image is approximately the same as the time interval between the charging of the photoconductor and the scanning of the photoconductor to produce the X-ray image.

3. Apparatus for producing an X-ray image comprising:
   an X-ray responsive photoconductor having a surface;
   means for uniformly placing an electric charge on said photoconductor surface;

scanning means for determining the local distribution of charge on said surface;

means for exposing said surface to X-rays;

a first memory for storing a representation of the local charge distribution on said surface after exposure to X-rays;

a second memory for recording a charge distribution from said surface in the absence of exposure to X-rays;

table look-up means for storing values of correction factors, K(V), which are proportional to local charge density values in the first memory; and means for multiplying the values stored in the second memory by the values of the correction factor stored in the table look-up means and subtracting the multiplied values from the values stored in the first memory means to yield an X-ray image which is corrected to compensate for local defects in the photoconductor surface.

4. The apparatus of claim 3 wherein the photoconductor essentially consists of a selenium layer and the electric field strength in the charged selenium layer is between two volts per micrometer and 4 volts per micrometer.

* * * * *